(No Model.) 2 Sheets—Sheet 1.

F. B. HUNT.
THILL COUPLING.

No. 477,053. Patented June 14, 1892.

Witnesses
G. A. Tauberschmidt,
Clif. D. Maxwell

Inventor
Franklin B. Hunt
By Maxwell & Chase
Attorneys

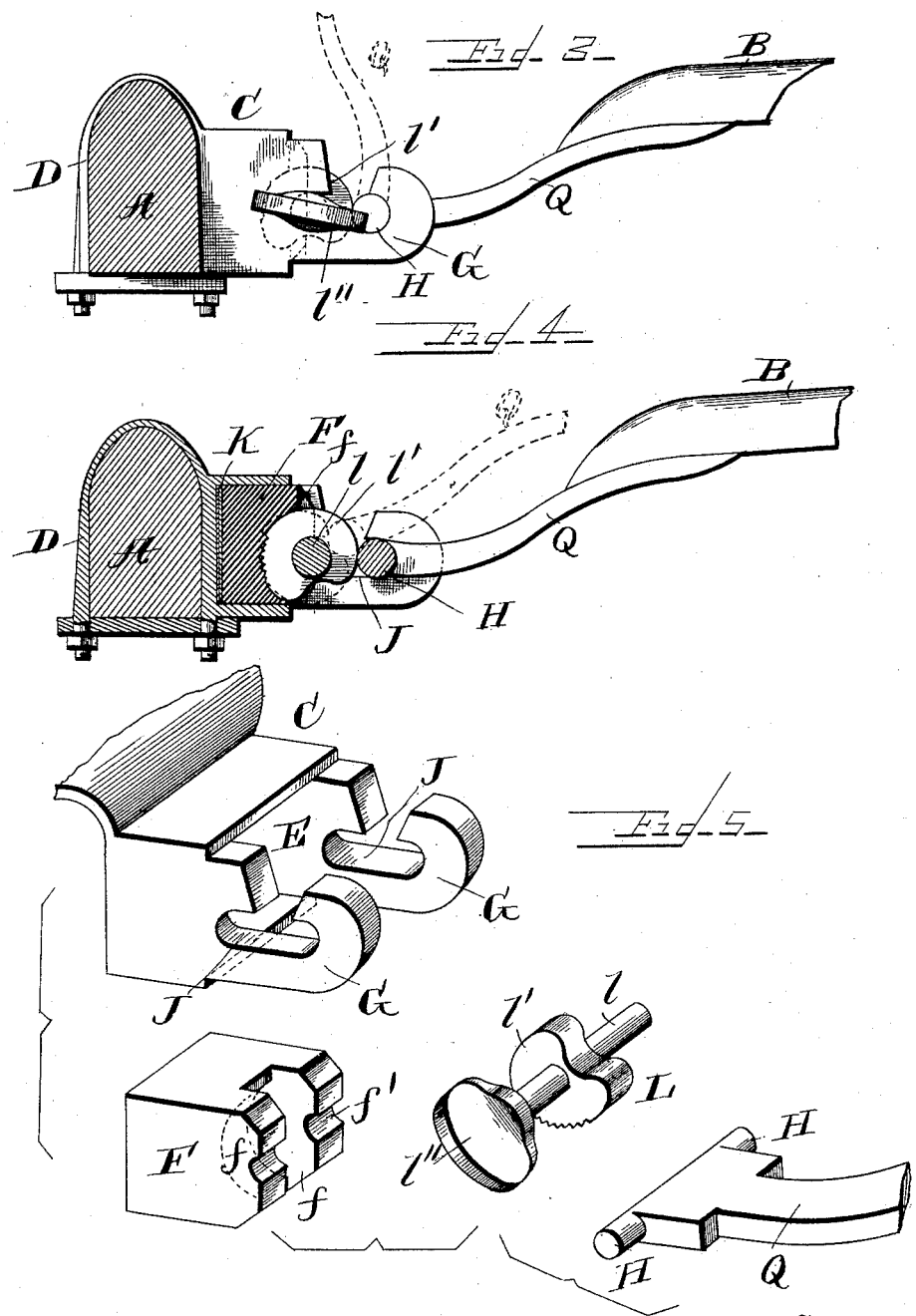

UNITED STATES PATENT OFFICE.

FRANKLIN B. HUNT, OF WASHINGTON, DISTRICT OF COLUMBIA, ASSIGNOR OF ONE-HALF TO JOHN T. CLEMENTS AND GEORGE S. CHASE, OF SAME PLACE.

THILL-COUPLING.

SPECIFICATION forming part of Letters Patent No. 477,053, dated June 14, 1892.

Application filed January 25, 1892. Serial No. 419,189. (No model.)

*To all whom it may concern:*

Be it known that I, FRANKLIN B. HUNT, a citizen of the United States, residing at Washington, in the District of Columbia, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, forming a part of this specification, in which like letters of reference refer to like parts in all the figures.

My invention relates to devices for attaching poles or thills to the axles of wagons or carriages; and it consists of the peculiar construction, arrangement, and combination of parts hereinafter fully described, and specifically pointed out in the claims, and has for its object to provide a coupling whereby poles or shafts may be quickly attached or detached, will prevent the same from rattling, and will hold up the poles or shafts out of the way when not in use.

Figure 1:
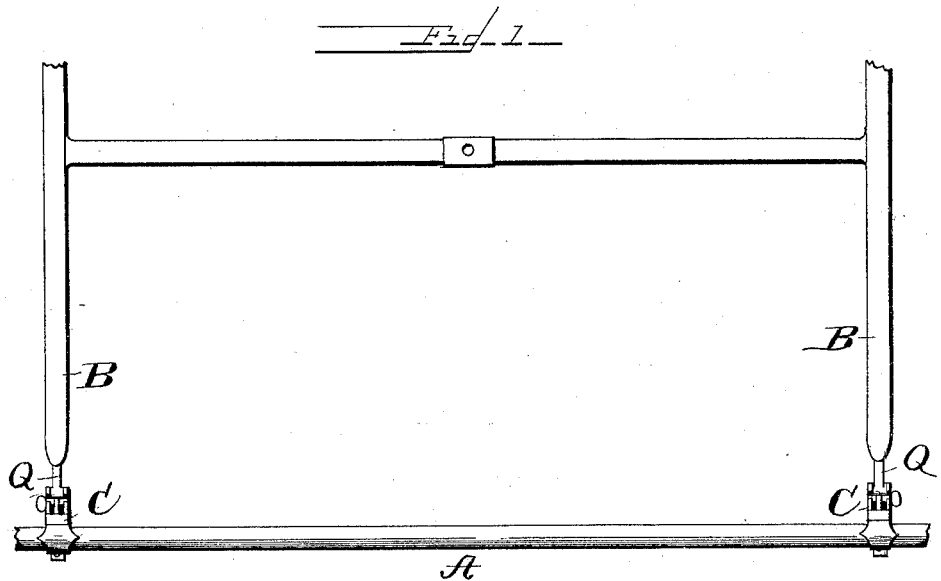
Figure 2:
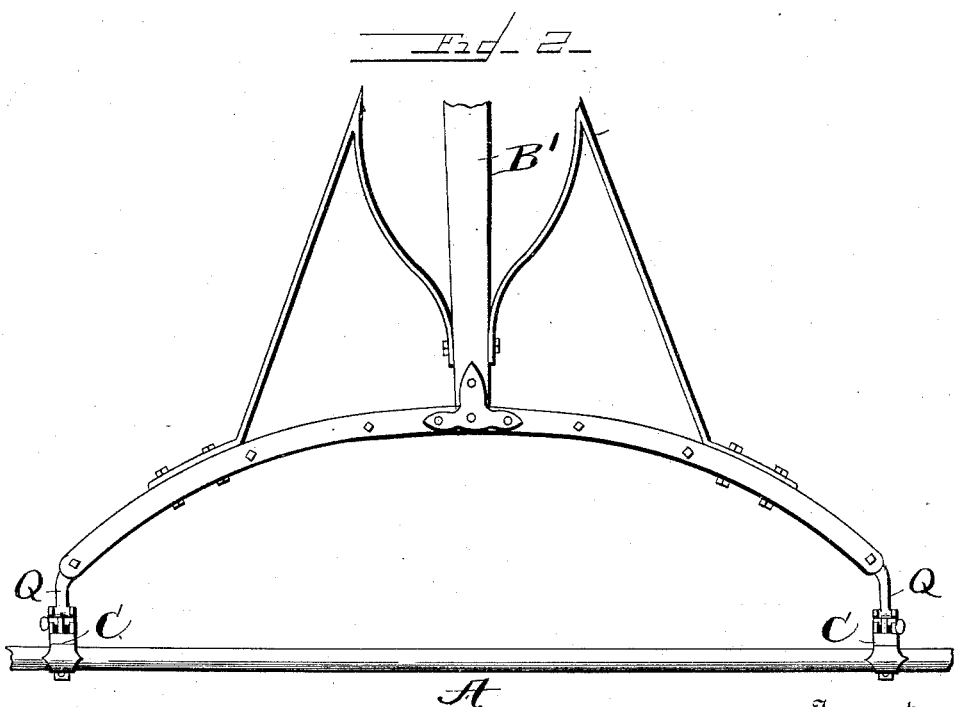

Figure 1 is a plan view of my device attached to an axle and shaft, and Fig. 2 is a like view of my device attached to an axle and pole. Fig. 3 is a side elevation of my device attached to an axle and shaft, the axle being in section, the dotted lines showing the shaft raised and locked in position when not in use. Fig. 4 is a sectional view of the same, the dotted lines showing the position of the parts when the shaft is being removed or placed in position; and Fig. 5, perspective views of the various parts of my coupling.

A is the axle. B is the shaft, B' the pole, and C my coupling. My coupling consists of the ordinary clip D, having a front socket or recess E for the reception of the rubber cushion F. The arms G G of the clip extend forward and are adapted to hold the journal portion H of the shaft or pole iron Q. The arms G G are circularly recessed in front and rear, as indicated at J, and open at the top to admit the insertion of the key L and the journal portion H of the shaft or pole iron Q. The rubber cushion F is of the configuration shown in Fig. 5, having vertical circular recess $f$ in its front or outer side and horizontal circular seats $f'$ in the lips formed by said recess. The key L consists of a shaft $l$, having a boss $l'$ midway of its length and a finger-piece $l''$ at one end. The boss $l'$ of the key L is circularly eccentric and cut away circularly on one side of its periphery, as shown, and notched or toothed on the opposite side.

In use, the clips being attached to the axle A, the rubber cushions F are inserted in the sockets E and the keys L placed in the rear recesses of the arms G, their bosses fitting in the recesses of the rubber cushions and their circularly-cut-away portions being forward and upward. The journal portion H of the shaft or pole irons are then inserted in the front recesses of the arms G, in which act the keys L are partially turned and hold the shaft or pole loosely. The keys are then turned by means of the finger-pieces and the shaft or pole is locked securely in place, the bosses pressing against the rubbers and journals of the shaft or pole. The eccentric construction of the bosses and the teeth on their periphery bearing in the rubber prevent the key from turning or loosening. To provide for the wear of the bearing parts, thin plates, cards, or springs K may be placed in the sockets E of the clip, so as to press the rubber forward or compensate for the wear of any of said parts. By this construction it can readily be seen that the change from shaft to pole or pole to shaft can be made very quickly, there can be no rattling of the parts, and the shafts or pole can be locked in position for use or out of the way when not in use.

Having thus described my invention, what I claim, and desire to secure by Letters Patent, is—

1. A rubber cushion provided with a vertical circular recess and horizontal circular seats, substantially as described.

2. A key consisting of a shaft provided with a boss midway of its length and a finger-piece at one end, said boss being circularly eccentric and cut away circularly on one side of its periphery and toothed or notched on the opposite side, substantially as described.

3. The combination, with a recessed clip having circularly-recessed arms, of a rubber cushion having a vertical circular recess and horizontal seats, and a key provided with a boss and finger-piece, substantially as described.

4. The combination, with a recessed clip having circularly-recessed arms, of a rubber cushion having a vertical circular recess and horizontal seats, a key provided with a boss and finger-piece, and the spring in the recess of the clip, substantially as described.

In testimony whereof I affix my signature in presence of two witnesses.

FRANKLIN B. HUNT.

Witnesses:
  GEO. L. CLARK,
  CLIF. D. MAXWELL.